US011385968B2

(12) United States Patent
Appireddygari Venkataramana et al.

(10) Patent No.: US 11,385,968 B2
(45) Date of Patent: Jul. 12, 2022

(54) SYSTEM AND METHOD FOR A DYNAMIC DATA STREAM PRIORITIZATION USING CONTENT BASED CLASSIFICATION

(71) Applicant: EMC IP Holding Company LLC, Hopkinton, MA (US)

(72) Inventors: Mahesh Reddy Appireddygari Venkataramana, Bangalore (IN); Gururaj Reddy Kulkarni, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

(21) Appl. No.: 16/779,718

(22) Filed: Feb. 3, 2020

(65) Prior Publication Data

US 2021/0240576 A1 Aug. 5, 2021

(51) Int. Cl.
*G06F 11/14* (2006.01)
*G06F 9/48* (2006.01)

(52) U.S. Cl.
CPC ........ *G06F 11/1464* (2013.01); *G06F 9/4881* (2013.01); *G06F 11/1451* (2013.01); *G06F 11/1461* (2013.01); *G06F 11/1469* (2013.01)

(58) Field of Classification Search
CPC .............. G06F 11/1464; G06F 9/4881; G06F 11/1469; G06F 11/1461; G06F 11/1451
USPC ......................................................... 711/162
See application file for complete search history.

(56) References Cited

U.S. PATENT DOCUMENTS 10,754,588 B2 * 8/2020 Guim Bernat ........ G06F 9/4843
2016/0373291 A1 * 12/2016 Domemann .......... H04L 41/042

* cited by examiner

*Primary Examiner* — Yair Leibovich
(74) *Attorney, Agent, or Firm* — Chamberlain, Hrdlicka, White, Williams & Aughtry (57) ABSTRACT

A method for performing backup operations includes obtaining, by a stream allocator operating in a backup storage system, a plurality of media management entries, wherein a media management entry of the plurality of media management entries specifies a data object, a relative priority, and a maximum number of streams, selecting the media management entry based on the relative priority, allocating a number of backup streams to the data object based on the maximum number of streams, and initiating a transfer of a backup of the data object from the production host to the backup storage system.

14 Claims, 7 Drawing Sheets

SYSTEM AND METHOD FOR A DYNAMIC DATA STREAM PRIORITIZATION USING CONTENT BASED CLASSIFICATION

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a stream allocator operating in a backup storage system, a plurality of media management entries, wherein a media management entry of the plurality of media management entries specifies a data object, a relative priority, and a maximum number of streams, selecting the media management entry based on the relative priority, allocating a number of backup streams to the data object based on the maximum number of streams, and initiating a transfer of a backup of the data object from the production host to the backup storage system.

In general, in one aspect, the invention relates to a system that includes a processor and memory that includes instructions which, when executed by the processor, perform a method. The method includes obtaining, by a stream allocator operating in a backup storage system, a plurality of media management entries, wherein a media management entry of the plurality of media management entries specifies a data object, a relative priority, and a maximum number of streams, selecting the media management entry based on the relative priority, allocating a number of backup streams to the data object based on the maximum number of streams, and initiating a transfer of a backup of the data object from the production host to the backup storage system.

In general, in one aspect, the invention relates to a non-transitory computer readable medium that includes computer readable program code, which when executed by a computer processor enables the computer processor to perform a method for performing backup operations. The method includes obtaining, by a stream allocator operating in a backup storage system, a plurality of media management entries, wherein a media management entry of the plurality of media management entries specifies a data object, a relative priority, and a maximum number of streams, selecting the media management entry based on the relative priority, allocating a number of backup streams to the data object based on the maximum number of streams, and initiating a transfer of a backup of the data object from the production host to the backup storage system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relate to performing a backup operation using a content-based classification of data to dynamically allocate data streams (also referred to as backup streams) to data generated by virtual machines. A classification tag may be assigned to data objects and a rules database may be queried to determine a relative priority and/or a maximum number of streams to be allocated to the data object. The relative priority and the maximum number of streams may be stored in a media management queue. A stream allocator of a backup storage system may use the media management queue when allocating data streams to each data object. The data objects may subsequently be streamed in accordance with the allocated data streams.

Figure 1:
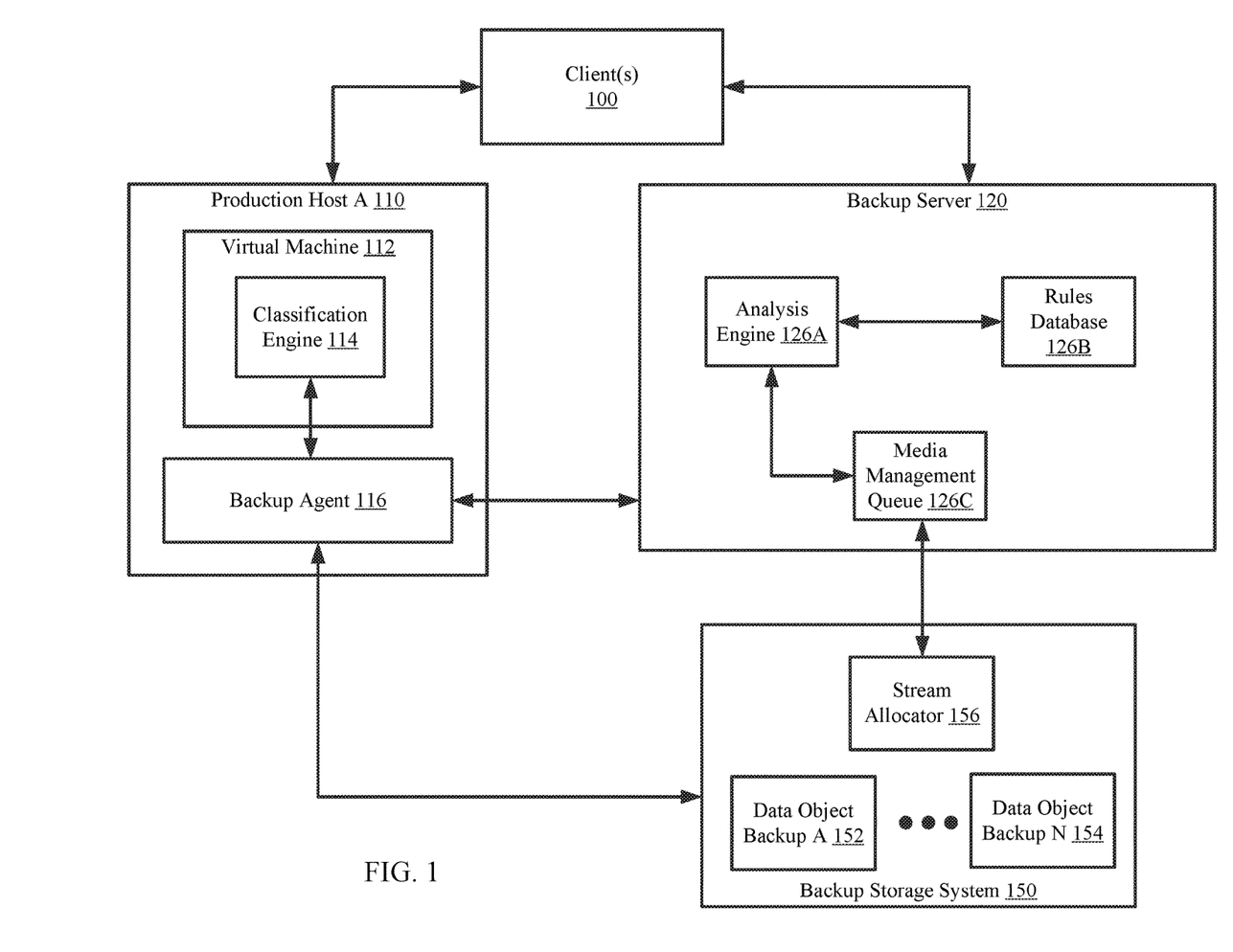
FIG. 1 shows a diagram of a system in accordance with one or more embodiments of the invention.

FIG. 1 shows a diagram of a system in accordance with one or more embodiments of the invention. The system may include one or more clients (100), a production host (110), a backup server (120), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) hosts virtual machines (VMs) (e.g., 112). The VMs (112) may be logical entities executed using computing resources (not shown) of the production host (110). Each of the virtual machines hosted by the production host (110) may be performing similar or different processes. In one or more embodiments of the invention, the VM (112) provides services to users, e.g., clients (100). For example, the VM (112) may host components. The components may be, for example, instances of databases, email servers, and/or other applications. The VMs (112) may host other types of components without departing from the invention. While the production host is illustrated to host one virtual machine (112), the production host may host multiple virtual machines without departing from the invention. The discussion of the virtual machine (112) throughout this application may apply to any virtual machine hosted by the production host (110).

In one or more embodiments of the invention, the virtual machine (112) includes a classification engine (114). The classification engine (114) collects data that specifies the functionality, use, and/or other information associated with the virtual machine (112). The collected data may be, for example, classification data. The classification data may be provided to the backup agent (116) and/or other entity of the system without departing from the invention.

In one or more embodiments of the invention, the classification engine (114) obtains the classification data by sending application programming interface (API) commands to the applications operating on the virtual machine. For example, a virtual machine may host multiple databases. The classification engine (114) may send API commands to each database to obtain a copy of all or a portion of data and/or metadata being generated by the application.

In one or more embodiments of the invention, the classification engine (114) sends the API requests to multiple virtual machines hosted by the production host (110). In this manner, each classification engine (114) may monitor the data of one or more virtual machines.

In one or more of embodiments of the invention, the virtual machine (112) is implemented as computer instructions, e.g., computer code, stored on a persistent storage (e.g., on the production host (110)) that when executed by a processor(s) of the production host (110) cause the production host (110) to provide the functionality of the virtual machine (112) described throughout this application.

In one or more embodiments of the invention, the production host (110) includes a backup agent (116). The backup agent may include functionality for generating backups of data objects stored in the virtual machine (112). The data objects may be, for example, documents, files, collections of files, and/or other portions of data that may be associated with a classification tag. Further, the backup agent (116) may include functionality for sending the backups to the backup storage device (150).

In one or more embodiments of the invention, the backup agent (116) may send backups of the data objects in backup streams. In one or more embodiments of the invention, a backup stream is a sequence of data that is allocated to a data object and is used for transmitting all or a portion of the data object from the production host (110) to the backup storage system (150).

In one or more embodiments of the invention, the backup agent (116) further includes functionality for generating classification tags in accordance with the classification data obtained from the classification engine (114). The classification tag may be, for example, a string of numbers, letters, and/or characters that specify a classification of the data. The classification may be a measurement of how important a data object is. Further, the classification may be a measurement of how important the privacy of the data is. For example, a data object that is meant to be extremely private (e.g., hospital records, trade secret documents, etc.) are classified with a highly sensitive classification tag. The backup agent (116) may generate the classification tags in accordance with the method illustrated in FIG. 3A.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application and/or all, or a portion thereof, of the method illustrated in FIG. 3A.

Figure 3A:
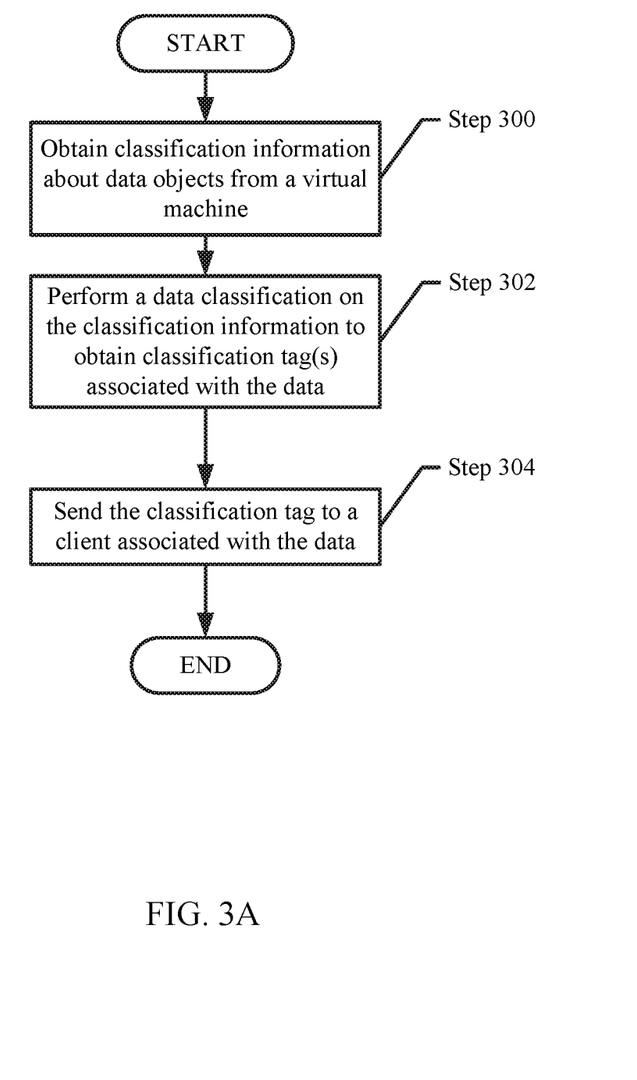
FIG. 3A shows a flowchart for generating classification tags in accordance with one or more embodiments of the invention.

In one or more of embodiments of the invention, the backup agent (116) is implemented as computer instructions, e.g., computer code, stored on a persistent storage that when executed by a processor of the production host (110) causes the production host (110) to provide the functionality of the backup agent (116) described throughout this application and/or all, or a portion thereof, of the method illustrated in FIG. 3A.

Figure 5:
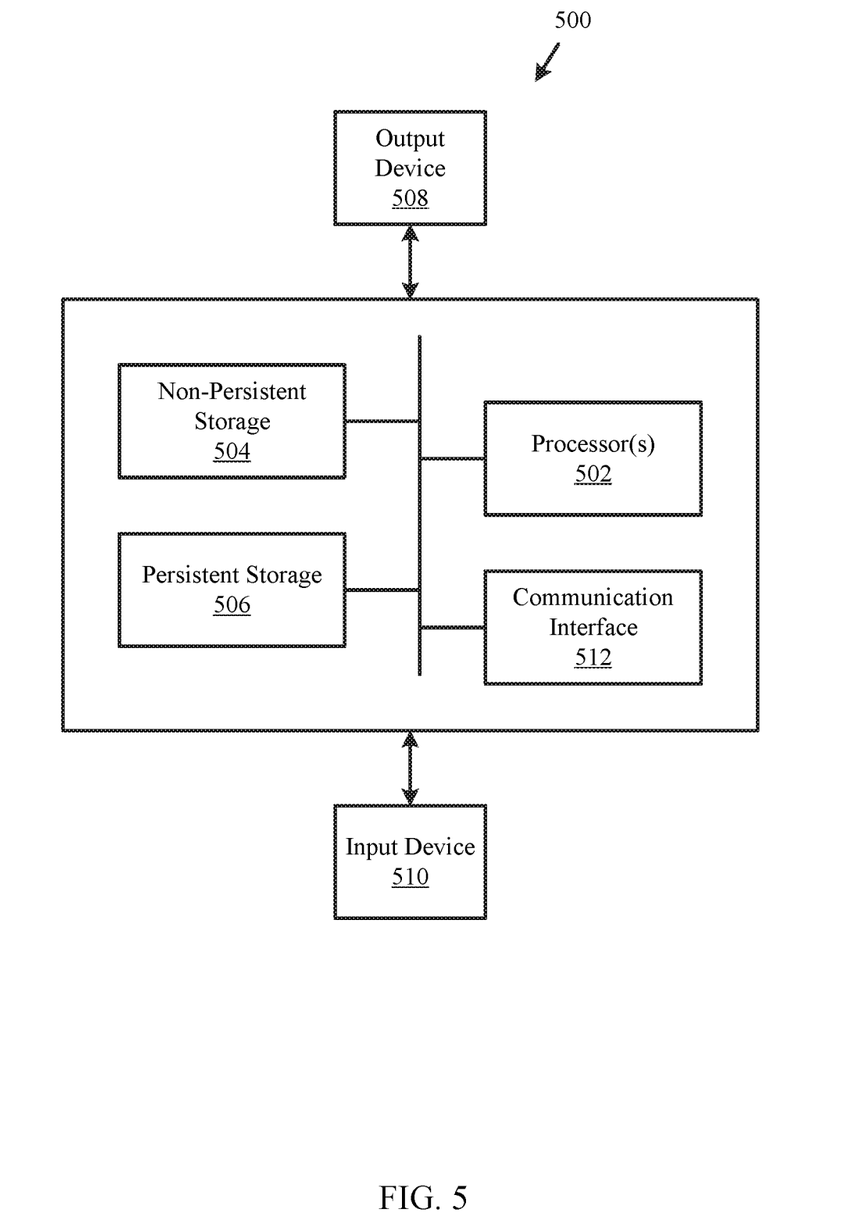
FIG. 5 shows a diagram of a computing device in accordance with one or more embodiments of the invention.

In one or more embodiments of the invention, the production host (110) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the backup server (120) services backup requests obtained from the clients (100). The backup requests may specify backing up the virtual machines (e.g., 112). The backup server (120) may service the backup requests in accordance with FIG. 3B. To perform the aforementioned functionality, the backup server (120) may include an analysis engine (126A), a rules database (126B), and a media management queue (126C). The backup server (120) may include additional, fewer, and/or different components without departing from the invention. Each of the aforementioned components are discussed below.

In one or more embodiments of the invention, the analysis engine (126A) processes obtained classification tags, e.g., obtained from the Backup Agent (116). The classification tag may be applied to data objects. The analysis engine (126A) may process the data objects by analyzing the classification tags using the rules database (126B) (discussed below) and storing entries in the media management queue (126C).

In one or more of embodiments of the invention, the analysis engine (126A) is implemented as computer instructions, e.g., computer code, stored on a persistent storage that when executed by a processor of the backup server (120) causes the backup server (120) to provide the functionality of the analysis engine (126A) described throughout this application and/or all, or a portion thereof, of the method illustrated in FIG. 3A.

In one or more embodiments of the invention, the rules database (126B) stores rules for how to manage data objects based on classification tags associated with each data. Each rule in the rules database (126B) may specify, for example, a classification tag, a priority of the classification tag, and/or a maximum number of backup streams that may be allocated to data associated with the classification tag.

For example, a rule may specify that data of a classification tag of "security announcement" is to have a maximum number of one backup streams and a relative priority of two. In such scenarios, any data objects associated with the classification tag "security announcement" would be allocated up to one backup stream and would be prioritized over (e.g., would be transmitted before) any other data objects with classification tags with a relative priority of three or higher.

In one or more embodiments of the invention, the media management queue (126C) stores media management entries (discussed in FIG. 2) that specify data objects to be backed up. The media management entries may be generated by the analysis engine (126A) as a result of processing the data objects to be backed up (e.g., via the method of FIG. 3B).

In one or more embodiments of the invention, the backup server (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup server (120) described throughout this application and/or all, or a portion thereof, of the method illustrated in FIG. 3B.

In one or more embodiments of the invention, the backup server (120) is implemented as a logical device. The logical device may utilize the computing resources of any number of computing devices and thereby provide the functionality of the backup server (120) described throughout this application and/or all, or a portion thereof, of the method illustrated in FIG. 3B.

In one or more embodiments of the invention, the client(s) (100) utilize services provided by the production host (110), and/or the backup server (120). Specifically, the client(s) (100) may utilize the virtual machines (112) to obtain, modify, and/or store data. The data may be generated from applications hosted in the virtual machine (112). Further, the client(s) (100) may utilize the backup server (120) to initiate backups of the virtual machines (e.g., 112). The client(s) (100) may trigger a backup operation performed by the backup server (120) by sending a backup request to the backup agent (116) that specifies backing up the virtual machine (112).

In one or more embodiments of the invention, a client (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) store backups of data objects associated with the virtual machines. In one or more embodiments of the invention, a backup (also referred to as a data object backup (152, 154)) is a copy of a data object to be stored in a backup storage system (150).

In one or more embodiments of the invention, the backup storage system (150) includes a limited number of backup streams. The backup streams, which may be used to transmit backups of data objects from the backup agent (116) to the backup storage system (150) may each be allocated to a data object. As backup streams get allocated, the number of available backup streams decreases. The allocation of the backup streams may be managed by a stream allocator (156) of the backup storage system (150).

In one or more embodiments of the invention, the stream allocator (156) allocates backup streams to data objects that are to be backed up. The stream allocator (156) may utilize the media management queue (126C) when determining how to allocate the backup streams.

Figure 3B:
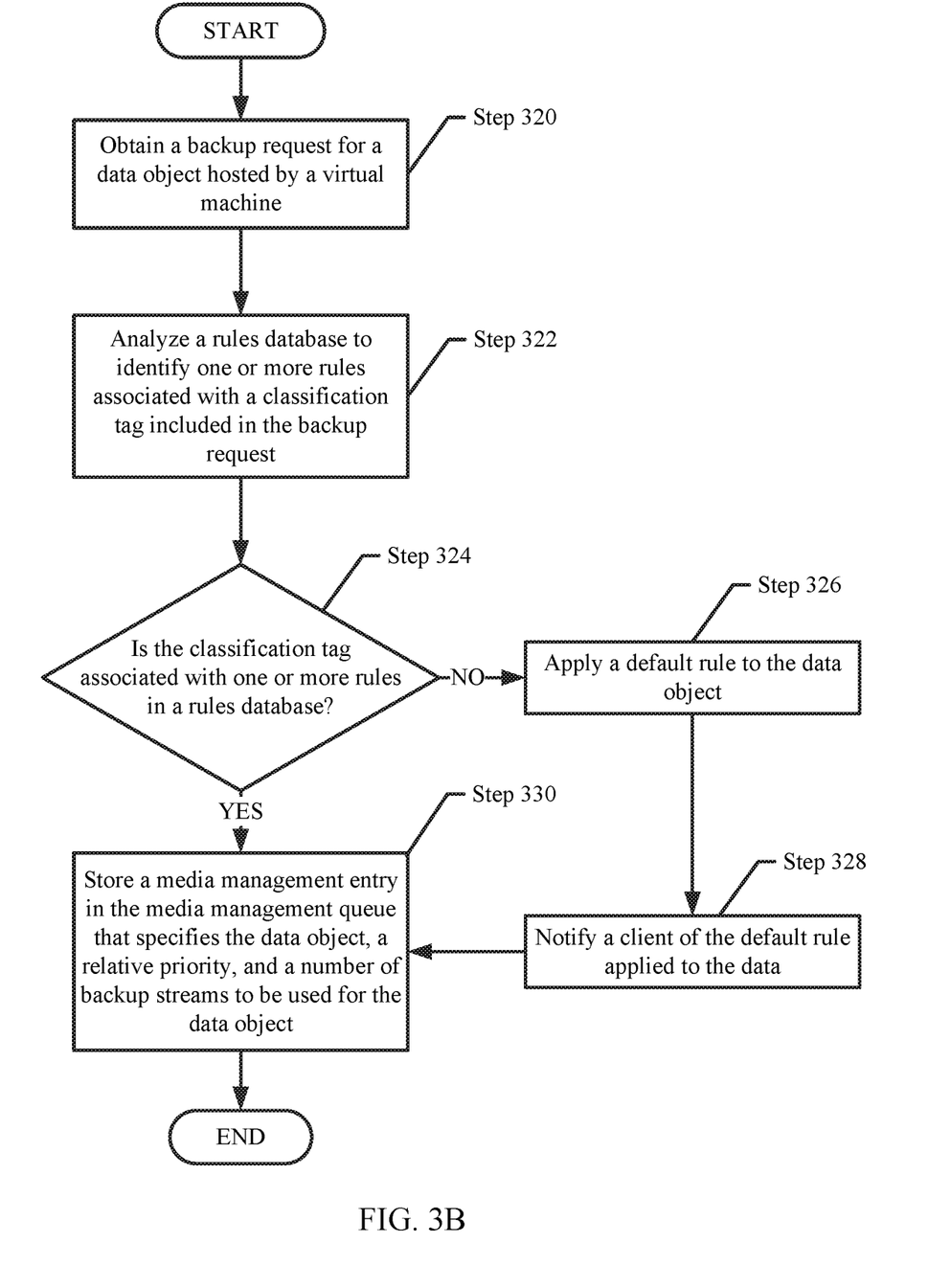
FIG. 3B shows a flowchart for servicing backup requests in accordance with one or more embodiments of the invention.
Figure 3C:
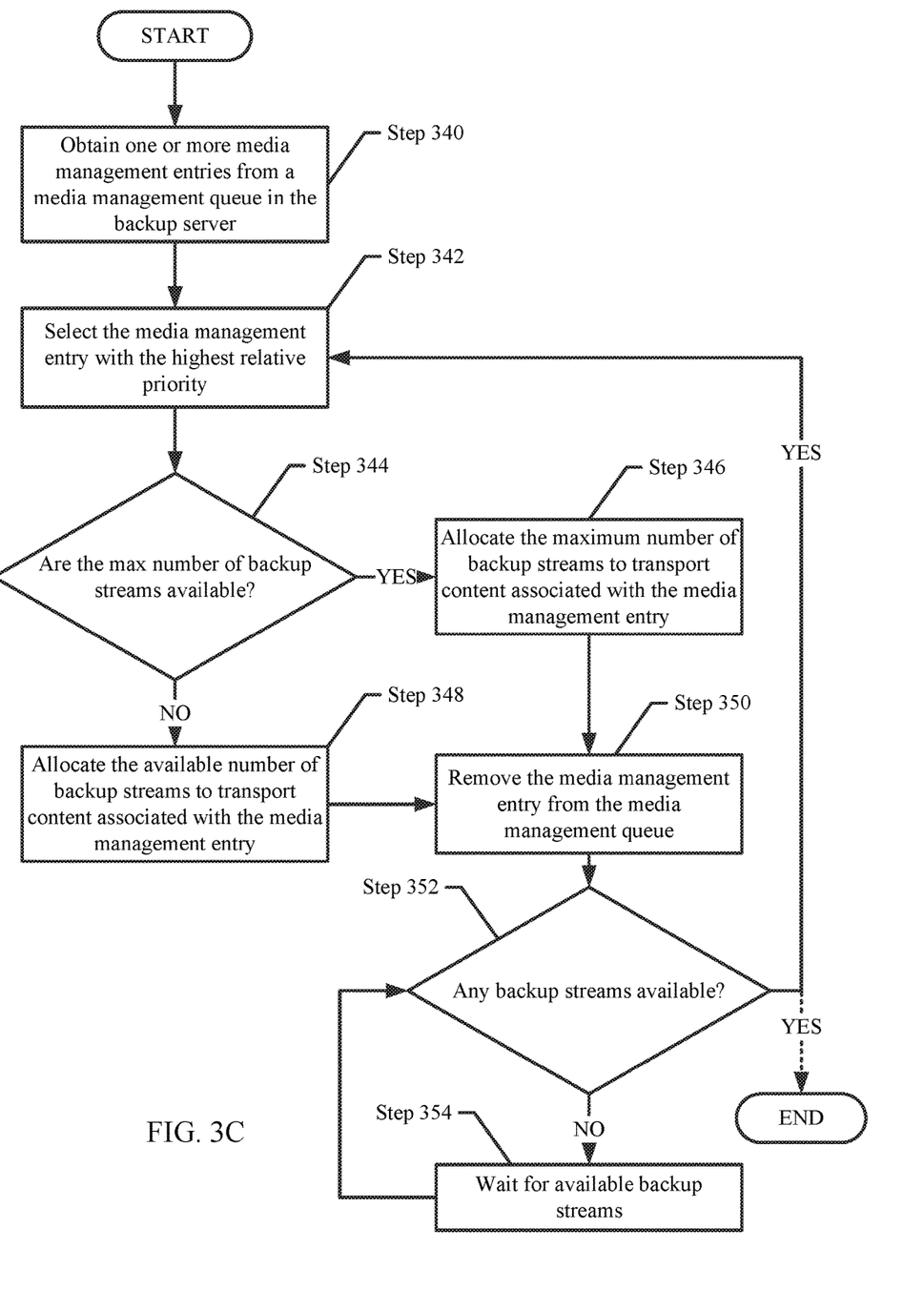
FIG. 3C shows a flowchart for performing backup stream prioritizations in accordance with one or more embodiments of the invention.

In one or more of embodiments of the invention, the stream allocator (156) is implemented as computer instructions, e.g., computer code, stored on a persistent storage that when executed by a processor of the backup storage system (150) causes the backup storage system (150) to provide the functionality of the stream allocator (156) described throughout this application and/or all, or a portion thereof, of the method illustrated in FIG. 3C.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
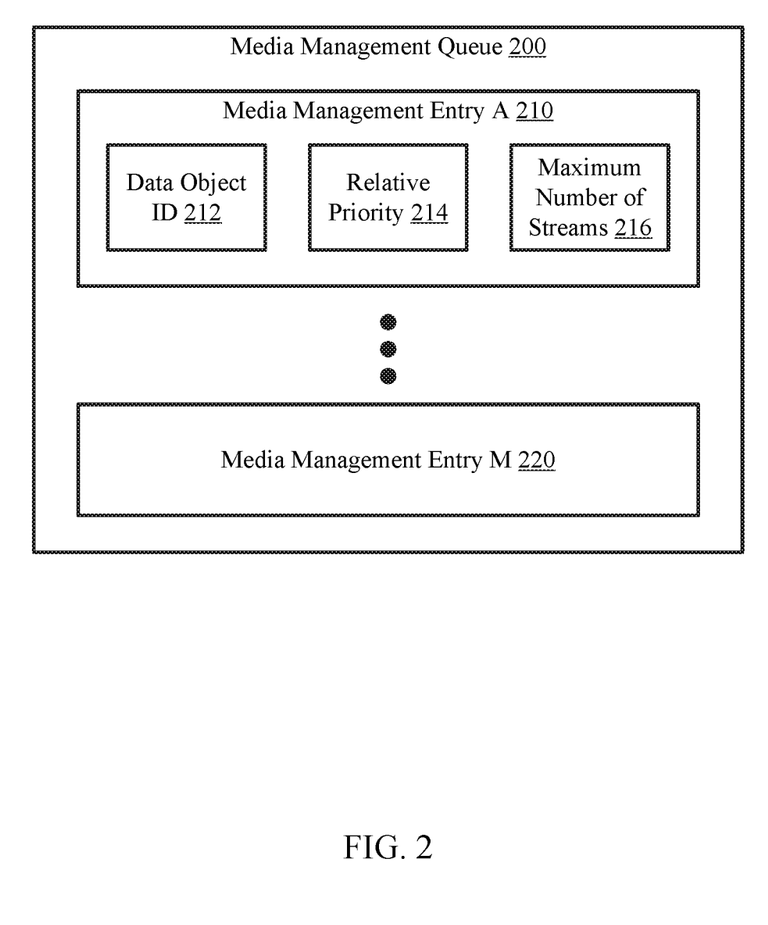
FIG. 2 shows a diagram of a media management queue in accordance with one or more embodiments of the invention.

FIG. 2 shows a diagram of a media management queue in accordance with one or more embodiments of the invention. The media management queue (200) of FIG. 2 may be an embodiment of the media management queue (126C) discussed above. As discussed above, the media management queue (200) may include entries (also referred to as media management entries). Each media management entry (210, 220) may specify a data object identifier (ID) (212), a relative priority (214), and a maximum number of streams (216). Each media management entry (210, 220) may specify additional, fewer, and/or different components without departing from the invention. Each of the aforementioned components is discussed below.

In one or more embodiments of the invention, the data object ID (212) is a unique identifier of a data object associated with the media management entry (210, 220). The data object ID (212) may be any combination of letters, numbers, and/or characters that may be used to uniquely identify the data object.

In one or more embodiments of the invention, the relative priority (214) is a value that specifies a priority of the data object relative to other data objects specified in the media management queue (200). The relative priority (214) may be a numerical value that, the higher the numerical value, the lower the priority relative to the other data objects.

In one or more embodiments of the invention, the maximum number of streams (216) is a numerical value that specifies the number of backup streams that may be allocated to the data object associated with the media management entry (210, 220) during a backup. The maximum number of streams (216) may be a numerical value (e.g., an integer larger than 0).

FIGS. 3A-3C show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 3A shows a flowchart for generating classification tags in accordance with one or more embodiments of the invention. The method shown in FIG. 3A may be performed by, for example, a backup agent (116, FIG. 1). Other components of the system illustrated in FIG. 1 may perform the method of FIG. 3A without departing from the invention.

In step 300, classification information is obtained from a virtual machine. In one or more embodiments of the invention, the classification information is obtained by the backup agent from a classification engine of the virtual machine. The backup agent may send a classification request to the classification engine to obtain the classification information. Alternatively, the classification information is obtained from the classification engine prior to obtaining the backup initiation request and stored in memory of the backup agent (e.g., periodically).

In one or more embodiments of the invention, the classification information specifies information associated with one or more data objects. The classification information of a data object may specify, for example, whether a name or a string of numbers is included in the data object. Such information may indicate a high sensitivity to the data (e.g., the string of numbers may be associated with a bank account number or a social security number).

In step 302, a data classification is performed on the classification information to obtain a classification tag and associate the classification tag with the corresponding data in the virtual machine. In one or more embodiments of the invention, the backup classification includes analyzing the obtained classification data to determine a type of data associated with the virtual machine.

For example, a virtual machine may host a database that stores hospital records. The classification information may include metadata that specifies the type of data in the database. The classification information may be analyzed to identify the type of data. The backup agent, based on the data classification, may tag each data object in the database as "hospital records".

In step 304, the classification tag is sent to a client associated with the data. In one or more embodiments of the invention, the client is associated with the data if the client generated and/or in some way has access to read from and/or write from the data. In one or more embodiments of the invention, the client is enabled to utilize the virtual machine and all data associated with the virtual machine.

FIG. 3B shows a flowchart for servicing backup requests in accordance with one or more embodiments of the invention. The method shown in FIG. 3B may be performed by, for example, a backup server (120, FIG. 1). Specifically, the method may be performed by the analysis engine (126A, FIG. 1) of the backup server. Other components of the system illustrated in FIG. 1 may perform the method of FIG. 3B without departing from the invention.

In step 320, a backup request is obtained for a data object hosted by a virtual machine. The backup request may specify the data object to be backed up. Further, the backup request may include a classification tag the data object specified in the backup request. The backup request may originate from the production host and/or the client.

In step 322, the rules database is analyzed to identify one or more rules associated with the data object. In one or more embodiments of the invention, the rules database is analyzed to identify a rule that specifies the classification tag of the data object. For example, if the classification tag is "hospital records," the classification tag may identify whether the rules database includes any rules that specify the classification tag "hospital records."

In step 324, a determination is made about whether the classification tag is associated with any one or more rules in the rules database. If the classification tag is associated with any one or more rules in the rules database, the method proceeds to step 330; otherwise, the method proceeds to step 326.

In step 326, a default rule is applied to the obtained backup. In one or more embodiments of the invention, the default backup is included in the rules database for any data objects with a classification tag that is not specified in the rules database. The default rule may specify a low maximum number of streams and a low priority.

In step 328, a client is notified of the default rule that is to be applied to the data object. In this manner, the client may be notified of the default rule and may prompt an update of the rules database by the client. In one or more embodiments of the invention, the notification may be a message (e.g., an email, a short message service text, a pop-up message, etc.) that specifies the data object and the default rule applied to the data object.

In step 330, a media management entry is stored in the media management queue. The media management entry may specify the data object (e.g., using a data object ID), a relative priority, and a maximum number of backup streams to be applied to the data object. The relative priority and the maximum number of streams may be based on the rule(s) identified in the rules database associated with the classification tag. Alternatively, if the classification tag was not associated with any rules in the rules database as determined in step 324, the relative priority and the maximum number of streams are based on the default rule applied to the data object in step 326.

While the above method discusses a backup request that specifies only one data object, the method may be performed with backup requests that specify multiple data objects. In such scenario, steps 322-330 may be repeated for each data object specified in the backup request of step 320.

FIG. 3C shows a flowchart for allocating backup streams in accordance with one or more embodiments of the invention. The method shown in FIG. 3B may be performed by, for example, a stream allocator (156, FIG. 1). Other components of the system illustrated in FIG. 1 may perform the method of FIG. 3B without departing from the invention.

In step 340, one or more media management entries are obtained from a media management queue in the backup server. In one or more embodiments of the invention, the media management entries are obtained in response to a notification that triggers the stream allocator to access the media management entries from the backup server. The notification may be, for example, a periodic message that triggers the stream allocator to obtain any media management entries from the media management queue. Alternatively, the notification may be from the backup server that notifies the stream allocator of recently-added media management entries associated with data objects that are to be backed up.

In step 342, the media management with the highest relative priority is selected. In one or more embodiments of the invention, the stream allocator analyzes the media management entries to identify the media management entry with the highest specified relative priority.

The stream allocator may further analyze the media management entries to identify whether any other media management entries specify the same relative priority as the identified highest relative priority. If there are multiple media management entries that specify the highest priority, the stream allocator may select from the multiple media management entries using a tie-breaking metric may be used.

In one or more embodiments of the invention, a tie-breaking metric is a characteristic of the data object that may be used to select a media management entry. A tie-breaking metric may be, for example, a data size of the data object, a timestamp for when the media management entry was generated, and/or any other metric associated with the data object or the media management entry without departing from the invention. For example, of the multiple media management entries with the highest priority, the media management entry of the data object with the smallest data size may be selected. The tie-breaking metric may be specified in the media management entry. For example, if the tie-breaking metric is the data size of the data object, the data size of the data object may be specified in each media management entry.

In step 344, a determination is made about whether the maximum (max) number of backup streams specified in the selected media management entry are available to be allocated to the data object. In other words, the determination is made about whether the available number of backup streams in the backup storage system is greater to or equal to the maximum number of streams specified in the selected media management entry. If the max number of backup streams are available, the method proceeds to step 346; otherwise, the method proceeds to step 348.

In step 346, the maximum number of backup streams are allocated. The content (e.g., the data object) associated with the media management entry is subsequently transported using the allocated number of backup streams. In this manner, the backup storage system initiates a transfer of a backup of the data object of the selected media management entry by sending a notification to the backup agent that specifies the allocated backup streams to be used for the transfer.

In step 348, following the determination of step 344, the available number of backup streams are allocated. The content (e.g., the data object) associated with the media management entry is subsequently transported using the allocated number of backup streams. In this manner, the backup storage system initiates a transfer of a backup of the data object of the selected media management entry by sending a notification to the backup agent that specifies the allocated backup streams to be used for the transfer.

In step 350, the media management entry is removed from the media management queue.

In step 352, a determination is made about whether any backup streams are available to be allocated. If no backup streams are available, the method proceeds to step 354; otherwise, the method proceeds to step 342 if there are other media management entries to be processed. If there are no more media management entries to be processed, the method ends following step 352.

In step 354, the stream allocator waits for available backup streams. In one or more embodiments of the invention, the stream allocator may wait until a notification is obtained that notifies the stream allocator of a completed transfer. If a transfer of a backup of a data object is complete, the streams allocated to the data object may become available. Once the allocated streams become available, the method may return to step 352.

Example

Figure 4:
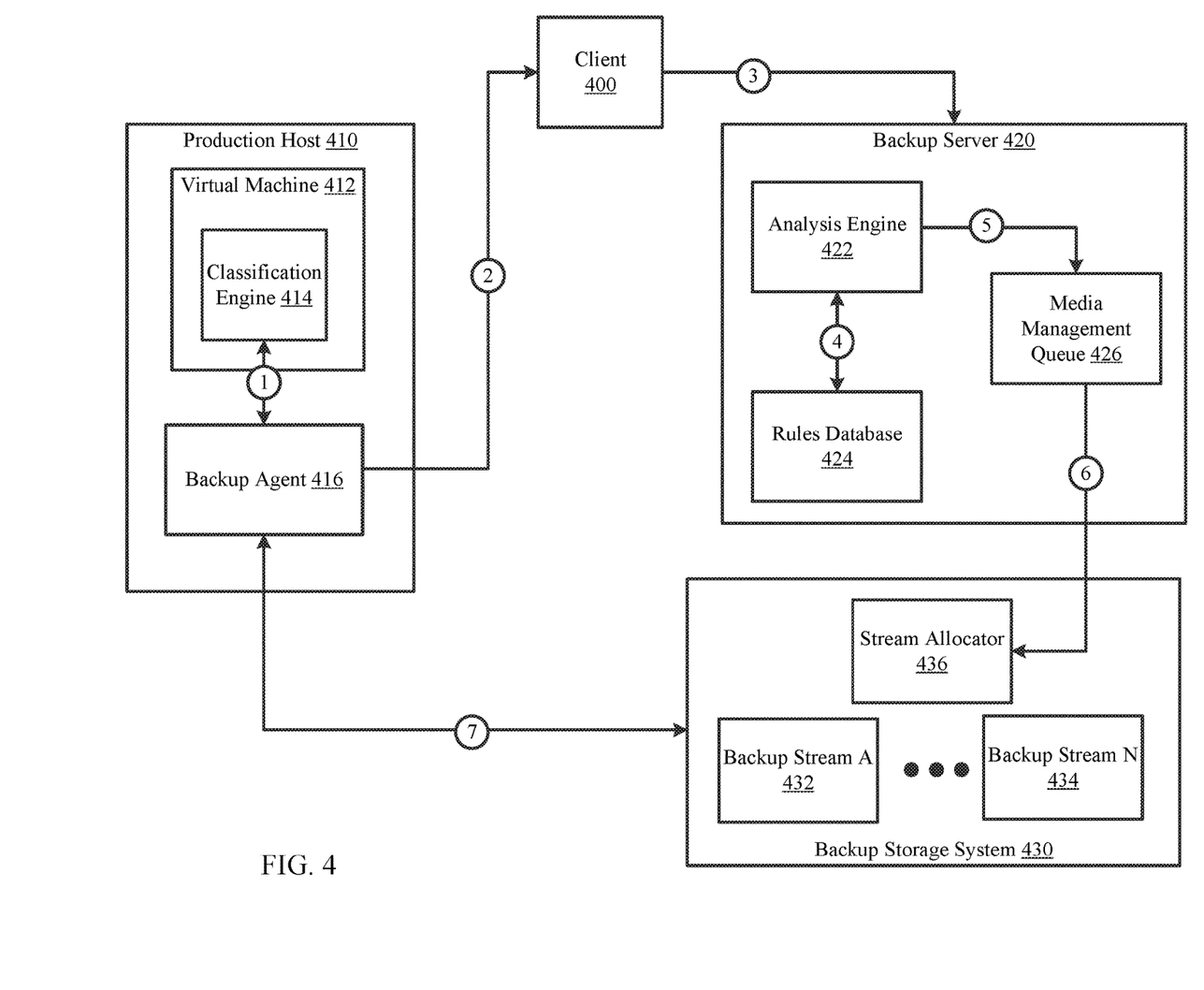
FIG. 4 shows an example in accordance with one or more embodiments of the invention.

The following section describes an example. The example, illustrated in FIG. 4, is not intended to limit the invention. Turning to the example, consider a scenario in which a system is performing a backup operation on a number of data objects. The system includes a client (500), a backup server (520), a production host (510), and a backup storage system (530).

Prior to the backup operation, the production host (410) performs a data classification of data objects A, B, C, and D (not shown) hosted by a virtual machine (412) of the production host (410). Specifically, a classification engine (414) of the virtual machine (412) sends classification information about the data objects to a backup agent (416) executing on the production host (410) [1]. The classification information may specify that data objects A includes a list of transactions within the ranges of USD $100,000 to $1,000,000; further, the classification information specifies that data objects B and C each include a username and password. Finally, the classification information specifies that data object D includes a document with text written in paragraph form and addressed to a sales department.

The data objects are classified based on the classification information. Specifically, data objects A is tagged with the classification tag "financial_transactions." Further, data objects B and C are each tagged with the classification tag "credentials." Finally, data object D is tagged with the classification tag "department_memo." The classification tags are sent to the client (400) [2].

The client (400) sends a backup request to back up data objects A, B, C, and D to the backup server (420) [3]. The backup server (420), using an analysis engine (422), analyzes a rules database (424) to determine a relative priority and a maximum number of backup streams for each data object. The rules in the rules database (424) are formatted in such a way that the classification tag, is specified, followed by the max number of streams, and then by the relative priority. The rules are identified as follows: "financial_transactions_3_2", "credentials_1_1", and "department_memo_2_3". Based on these rules, the credentials have the highest priority of one and with one maximum number of backup streams, followed by financial_transactions with a relative priority of two and a max number of streams of three, and department memos have the lowest relative priority of three and a maximum number of streams of two.

After the relative priority is identified for each relevant classification tag, the analysis engine (422) generates media management entries and stores them in a media management queue (424) [5]. The media management entries, generated based on the rules, are illustrated in Table A:

| Media Management Entry | Data Object ID | Relative Priority | Maximum Number of Backup Streams | Data Size (Megabytes) |
| --- | --- | --- | --- | --- |
| 1 | data_object_A | 2 | 3 | 300 |
| 2 | data_object_B | 1 | 1 | 4 |
| 3 | data_object_C | 1 | 1 | 20 |
| 4 | data_object_D | 3 | 2 | 50 |

Table A shown above illustrates each media management entry in the media management queue (424) as generated by the analysis engine (422). A stream allocator (436) of the backup storage system (430) accesses the media management entries and processes the data objects to assign each data object to backup streams [6].

Specifically, the stream allocator (436) performs the method of FIG. 3C and identifies media management entries 2 and 3 associated with the highest priority and selects, out of those media management entries, the one with the smallest data size. As a result, media management entry 2 is selected first. The stream allocator compares the maximum number of backup streams for this entry to the total number of available backup streams. In this example, the backup storage system (430) has six available backup streams initially. The stream allocator allocates one backup stream to data object B because it is associated with media management entry 2 and deletes media management entry 2. Further, the stream allocator (426) initiates the transmission of a backup of data object B.

The stream allocator continues the method of FIG. 3C and selects media management 3 because it is associated with the highest relative priority of the remaining media management entries. The total available number of remaining backup streams of five is greater than the maximum number of backup streams of one, so the stream allocator allocates one backup stream to data object C because it is associated with media management entry 3 and deletes media management entry 3. Further, the stream allocator (426) initiates the transmission of a backup of data object C using the allocated backup streams.

The stream allocator continues the method of FIG. 3C and selects media management 1 because it is associated with the highest relative priority of the remaining media management entries. The total available number of remaining backup streams of four is greater than the maximum number of backup streams of three, so the stream allocator allocates three backup stream to data object A because it is associated with media management entry 1 and deletes media management entry 1. Further, the stream allocator (426) initiates the transmission of a backup of data object A using the allocated backup streams.

The stream allocator (326) continues the method of FIG. 3C and selects media management 4 because it is associated with the highest relative priority of the remaining media management entries. The total available number of remaining backup streams of one is less than the maximum number of backup streams of two, so the stream allocator only allocates one backup stream (as opposed to the maximum number of two) to data object D because it is associated with media management entry 4 and deletes media management entry 4. Further, the stream allocator (426) initiates the transmission of a backup of data object D using the allocated backup streams.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation by intelligently prioritizing the streaming of more than one data object during the backup operation. The more sensitive data is prioritized by monitoring the data of a virtual machine and identifying characteristics of the data to determine the classification of the data. The classification of the data may then be used to allocate the maximum number of available backup streams. The more sensitive data may be allocated first, thus having a higher likelihood of the maximum number of backup streams to be allocated to the more sensitive data.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
  obtaining, by a stream allocator operating in a backup storage system, a plurality of media management entries, wherein a media management entry of the plurality of media management entries specifies a data object, a relative priority, and a maximum number of streams;
  selecting the media management entry based on the relative priority;
  allocating a number of backup streams to the data object based on the maximum number of streams, wherein allocating the number of backup streams to the data object based on the maximum number of streams comprises:
    making a determination that the maximum number of streams is higher than a total number of available backup streams of the backup storage system,
      wherein the number of backup streams is equal to the total number of available backup streams; and
    initiating a transfer of a backup of the data object from a production host to the backup storage system.

2. The method of claim 1, wherein the relative priority is a highest priority relative to the priorities in the plurality of media management entries.

3. The method of claim 2, wherein the relative priority is equal to a second relative priority of a second media management query, and wherein selecting the media management entry is further based on a tie-breaking metric.

4. The method of claim 1, wherein the media management entry is generated by a backup server operatively connected to the stream allocator.

5. The method of claim 4, wherein the media management entry is generated based on a rules engine stored in the backup server.

6. A system, comprising:
  a processor; and
  memory comprising instructions which, when executed by the processor, perform a method, the method comprising:
    obtaining, by a stream allocator operating in a backup storage system, a plurality of media management entries,
    wherein a media management entry of the plurality of media management entries specifies a data object, a relative priority, and a maximum number of streams;
    selecting the media management entry based on the relative priority;
    allocating a number of backup streams to the data object based on the maximum number of streams, wherein allocating the number of backup streams to the data object based on the maximum number of streams comprises:
      making a determination that the maximum number of streams is higher than a total number of available backup streams of the backup storage system,
        wherein the number of backup streams is equal to the total number of available backup streams; and
      initiating a transfer of a backup of the data object from a production host to the backup storage system.

7. The system of claim 6, wherein the relative priority is a highest priority relative to the priorities in the plurality of media management entries.

8. The system of claim 7, wherein the relative priority is equal to a second relative priority of a second media management query, and wherein selecting the media management entry is further based on a tie-breaking metric.

9. The system of claim 6, wherein the media management entry is generated by a backup server operatively connected to the stream allocator.

10. The system of claim 9, wherein the media management entry is generated based on a rules engine stored in the backup server.

11. A non-transitory computer readable medium comprising computer readable program code, which when executed by a computer processor enables the computer processor to perform a method for performing a backup operation, the method comprising:
  obtaining, by a stream allocator operating in a backup storage system, a plurality of media management entries,
  wherein a media management entry of the plurality of media management entries specifies a data object, a relative priority, and a maximum number of streams;
  selecting the media management entry based on the relative priority;
  allocating a number of backup streams to the data object based on the maximum number of streams, wherein allocating the number of backup streams to the data object based on the maximum number of streams comprises:
    making a determination that the maximum number of streams is higher than a total number of available backup streams of the backup storage system,
      wherein the number of backup streams is equal to the total number of available backup streams; and initiating a transfer of a backup of the data object from a production host to the backup storage system.

12. The non-transitory computer readable medium of claim 11, wherein the relative priority is a highest priority relative to the priorities in the plurality of media management entries.

13. The non-transitory computer readable medium of claim 12, wherein the relative priority is equal to a second relative priority of a second media management query, and wherein selecting the media management entry is further based on a tie-breaking metric.

14. The non-transitory computer readable medium of claim 11, wherein the media management entry is generated by a backup server operatively connected to the stream allocator.

* * * * *